(12) United States Patent
Saito et al.

(10) Patent No.: US 7,909,129 B2
(45) Date of Patent: Mar. 22, 2011

(54) STEERING SHAFT SUPPORT STRUCTURE OF MOTOR-DRIVEN STEERING ASSIST APPARATUS

(75) Inventors: Mitsuo Saito, Tochigi (JP); Koichi Hata, Tochigi (JP)

(73) Assignee: Showa Corporation, Saitama (JP)

(*) Notice: Subject to any disclaimer, the term of this patent is extended or adjusted under 35 U.S.C. 154(b) by 316 days.

(21) Appl. No.: 11/223,183

(22) Filed: Sep. 9, 2005

(65) Prior Publication Data

US 2006/0169525 A1    Aug. 3, 2006

(30) Foreign Application Priority Data

Jan. 28, 2005   (JP) ................. 2005-022107
Jan. 28, 2005   (JP) ................. 2005-022120
Jan. 28, 2005   (JP) ................. 2005-022126

(51) Int. Cl.
    *B62D 7/22*   (2006.01)
(52) U.S. Cl. .................................................. 180/444
(58) Field of Classification Search ............ 180/443, 180/444, 446
    See application file for complete search history.

(56) References Cited

U.S. PATENT DOCUMENTS

| 2,326,946 | A | * | 8/1943 | Huber ............ 280/93.513 |
| 6,006,854 | A |   | 12/1999 | Nakajima |
| 6,510,912 | B1 |  | 1/2003 | Atsuumi |

FOREIGN PATENT DOCUMENTS

| EP | 266255 A | * | 5/1988 |
| JP | 54102725 |   | 8/1979 |
| JP | 6231592 |    | 2/1987 |
| JP | 08164860 A | * | 6/1996 |
| JP | 200253053 |   | 2/2002 |
| JP | 2002037117 A | * | 2/2002 |
| JP | 2004-231011 A |  | 8/2004 |
| JP | 2004231011 |  | 8/2004 |

* cited by examiner

*Primary Examiner* — Kevin Hurley
(74) *Attorney, Agent, or Firm* — Orum & Roth LLC

(57) ABSTRACT

A steering shaft support structure of a motor-driven steering assist apparatus is disclosed in which a steering shaft supported to a vehicle body side is connected to an input shaft of the motor-driven steering assist apparatus supported to the vehicle body side, and the steering shaft is supported to a spherical sliding bearing attached to a vehicle body side stay.

4 Claims, 10 Drawing Sheets

STEERING SHAFT SUPPORT STRUCTURE OF MOTOR-DRIVEN STEERING ASSIST APPARATUS

BACKGROUND OF THE INVENTION

1. Field of the Invention

The present invention relates to steering shaft supporting structure of a motor-driven steering assist apparatus.

2. Description of the Related Art

In a motor-driven steering assist apparatus of a rough road traveling vehicle such as a buggy vehicle or the like, as described in Japanese Patent Application Laid-open No. 2004-231011 (patent document 1), there is a structure in which a steering shaft to which a steering wheel is fixed is supported to a shaft support member fixed to a vehicle body side via a bearing. The steering shaft is connected to an input shaft of a motor-driven steering assist apparatus supported to the vehicle body side. This structure assists steering force applied to the steering wheel by a driver on the basis of a torque generated by an electric motor.

The motor-driven steering assist apparatus in the patent document 1 has the following features. A single unit body covered by a housing has an input shaft to which a steering shaft of a steering wheel side is connected, an output shaft to which a wheel side steering member is connected, and a torque sensor which is provided between the input shaft and the output shaft. An electric motor is driven in correspondence to a detected torque of the torque sensor, a worm gear is coupled to a rotary shaft of the electric motor, and a worm wheel is coupled to the output shaft and is engaged with the worm gear built-in. Further, the housing can be attached to a vehicle body frame, such as via a vehicle body side bracket.

In the motor-driven steering assist apparatus in patent document 1, the steering shaft is radial supported to a shaft support member fixed to a vehicle body side stay via a bearing. The motor-driven steering assist apparatus is also supported to a vehicle body side bracket, and can regulate an attaching attitude only in a range of a play of a bolt insertion hole provided in the vehicle body side bracket. Accordingly, if the steering shaft and an input shaft of the motor-driven steering assist apparatus are shifted in axes, an axial displacement can be hardly accommodated, and the steering shaft and the input shaft can not be connected.

When the driver pulls up the steering wheel in an upward direction or pushes down in a downward direction in correspondence to a circumstance in the case that that the vehicle to which the motor-driven steering assist apparatus in the patent document 1 is mounted travels, there may be circumstances such that a pull-up load or a push-down load is applied in an axial direction of the steering shaft. At this time, if the steering shaft is displaced in an axial direction on the basis of the loads in the axial direction, there is a risk that the displacement affects a torque sensor so as to produce an improper operating signal in the torque sensor or break the torque sensor.

Further, where the driver pulls up the steering wheel in an upward direction or pushes down in a downward direction in correspondence to a circumstance such that that the vehicle to which the motor-driven steering assist apparatus in the patent document 1 is mounted travels, a pull-up load or a push-down load is applied in an axial direction of the steering shaft. At this time, if the steering shaft is displaced in an axial direction on the basis of the loads in the axial direction, there is a risk that the displacement affects a torque sensor so as to produce an improper operating signal in the torque sensor or break the torque sensor.

SUMMARY OF THE INVENTION

An object of the present invention is to improve connecting workability between a steering shaft and an input shaft of a motor-driven steering assist apparatus, in a motor-driven steering assist apparatus.

Another object of the present invention is to prevent a load in an axial direction applied to a steering shaft from a steering wheel from being applied to a torque sensor in a motor-driven steering assist apparatus, thereby securing stable steering assist performance.

Another object of the present invention is to improve connecting workability between a steering shaft and an input shaft of a motor-driven steering assist apparatus, in a motor-driven steering assist apparatus, and to prevent a load in an axial direction applied to the steering shaft from a steering wheel from being applied to a torque sensor, thereby securing stable steering assist performance.

The present invention relates to a steering shaft support structure of a motor-driven steering assist apparatus structured such that a steering shaft supported to a vehicle body side is connected to an input shaft of the motor-driven steering assist apparatus supported to the vehicle body side. The steering shaft is supported to a spherical bearing attached to a vehicle body side stay.

The present invention relates to a steering shaft support structure of a motor-driven steering assist apparatus structured such that a steering shaft supported to a vehicle body side is connected to an input shaft of the motor-driven steering assist apparatus supported to the vehicle body side. The steering shaft is supported to a bearing attached to a vehicle body side stay so as to be rotatable and immobile in an axial direction.

The present invention relates to a steering shaft support structure of a motor-driven steering assist apparatus structured such that a steering shaft supported to a vehicle body side is connected to an input shaft of the motor-driven steering assist apparatus supported to the vehicle body side. A spherical bearing is attached to a vehicle body side stay, and the steering shaft is supported to a bearing attached to an inner periphery of the spherical bearing so as to be rotatable and immobile in an axial direction.

BRIEF DESCRIPTION OF THE DRAWINGS

The present invention will be more fully understood from the detailed description given below and from the accompanying drawings which should not be taken to be a limitation on the invention, but are for explanation and understanding only.

The drawings.

DESCRIPTION OF THE PREFERRED EMBODIMENTS

Embodiment 1

Figure 1:
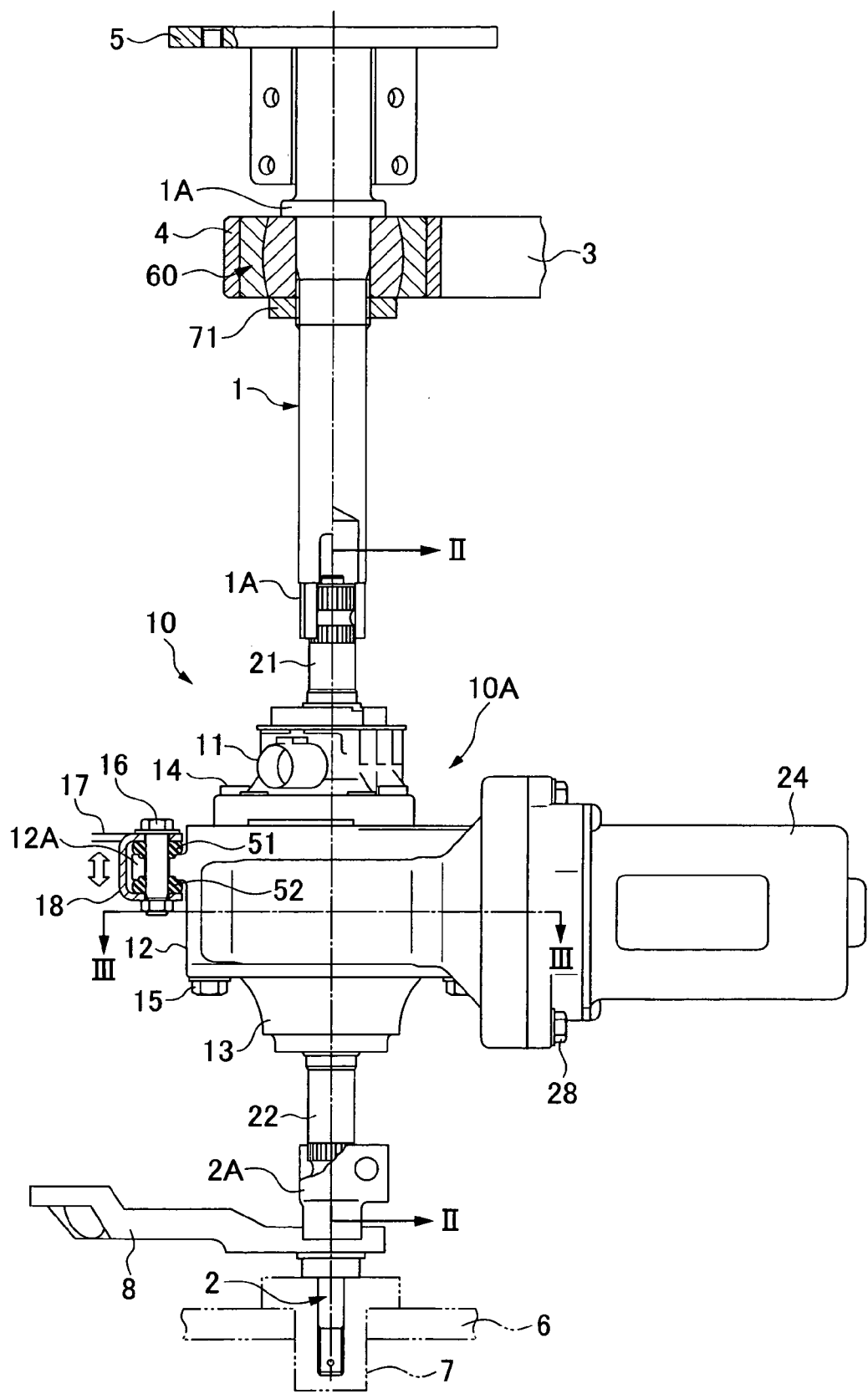
FIG. 1 is a front elevational view showing the motor-driven steering assist apparatus in accordance with an embodiment 1.

A motor-driven steering assist apparatus 10 may be applied to a rough road traveling vehicle, for example, a buggy vehicle, a snowmobile and the like. The apparatus is interposed between a steering wheel side steering shaft 1 and a tire wheel side steering member 2, as shown in FIG. 1, and assists steering force applied to the steering wheel by a driver on the basis of a generated torque of an electric motor 24.

The motor-driven steering assist apparatus 10 is structured such that the steering shaft 1 is rotatably supported to an upper vehicle body side stay 3 via a bearing mentioned below by a support member 4, and a steering wheel attaching member 5 is fixed to an upper end portion. The tire wheel side steering member 2 is rotatably supported to a lower vehicle body side stay 6 via a bearing by a support member 7, and a pitman arm 8 is fixed to an intermediate portion thereof. The pitman arm 8 is coupled to a front wheel via right and left tie rods. The upper vehicle body stay 3 and the lower vehicle body side stay 6 are supported to a vehicle body frame.

Figure 2:
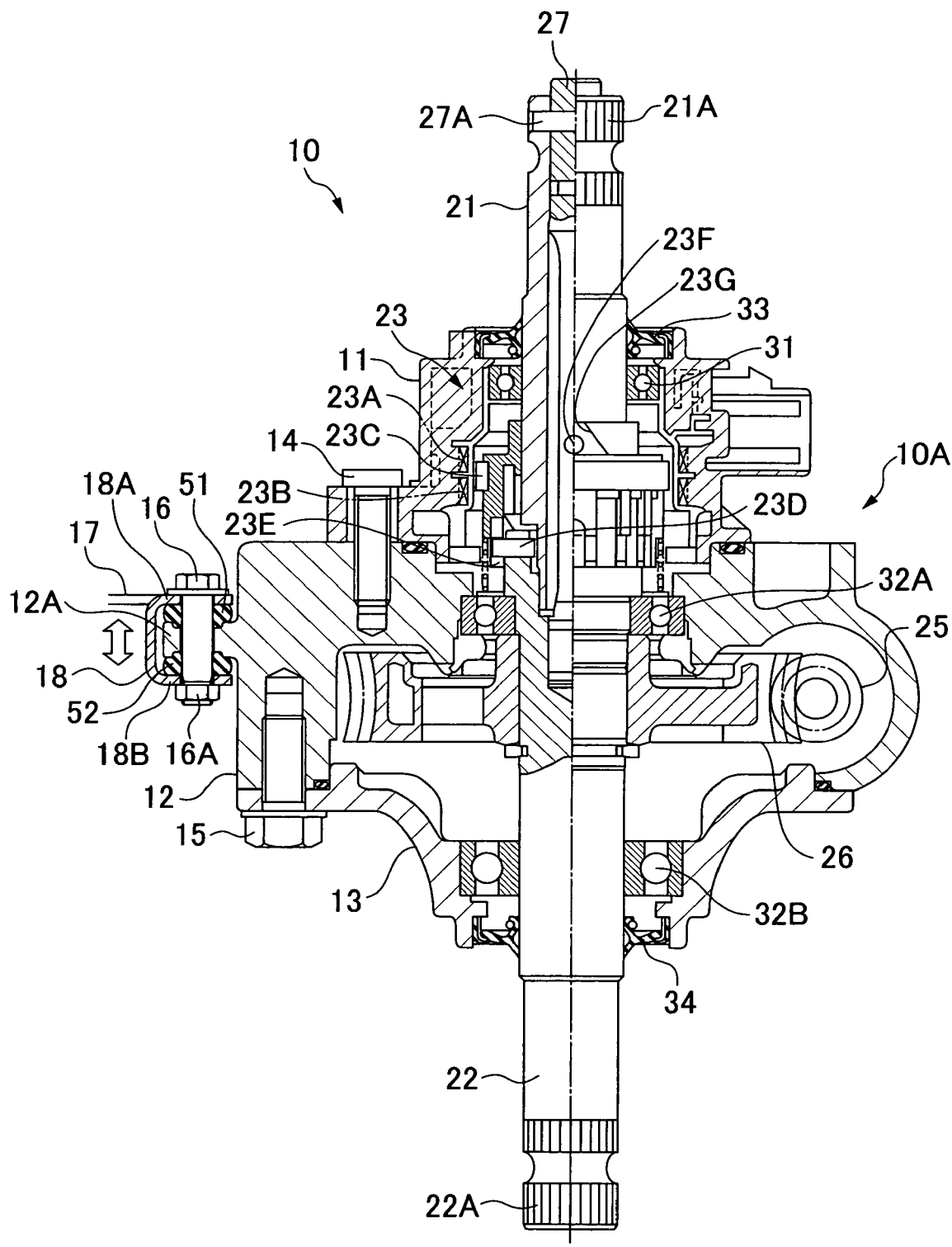
FIG. 2 is a cross sectional view along a line II-II in FIG. 1.
Figure 3:
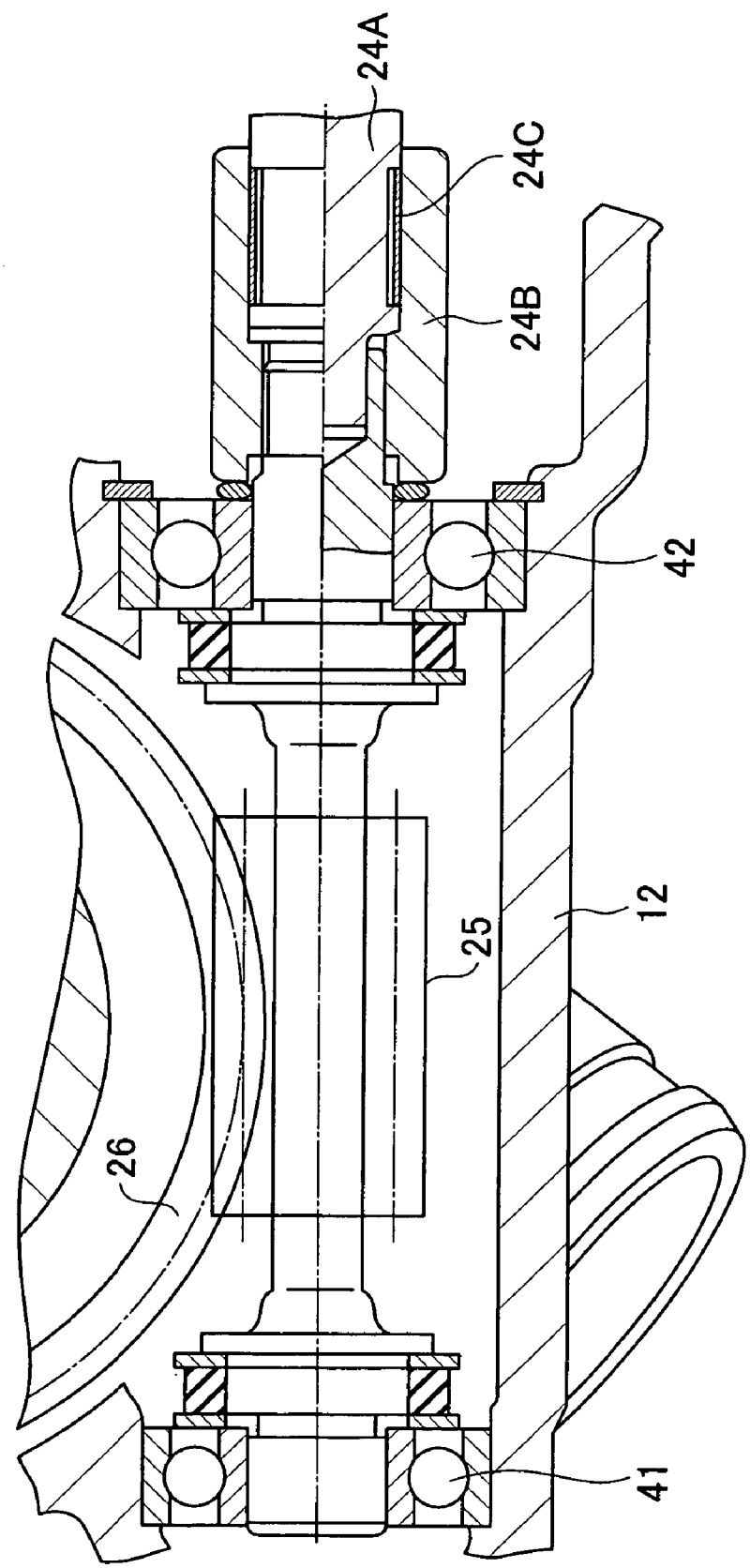
FIG. 3 is a cross sectional view along a line III-III in FIG. 1.

The motor-driven steering assist apparatus 10 is structured by a single unit body 10A covered by first housing 11 (upper housing or upper cover), second housing (main housing), and third housing (lower housing or lower cover) 13, as shown in FIGS. 1 to 3. The unit body 10A has an input shaft 21, an output shaft 22, a torque sensor 23, an electric motor 24, a worm gear 25 and a worm wheel 26 built-in.

The motor-driven steering assist apparatus 10 is structured such that an upper end portion of the input shaft 21 to which the steering shaft 1 is connected by a connecting device 1A is supported to the first housing 11 (FIG. 2) by the bearing 31. Upper and lower end portions of the output shaft 22 to which the tire wheel side steering member 2 is connected by a connecting device 2A are supported to the second housing 12 and the third housing 13 by upper and lower bearings 32A and 32B (FIG. 2). The input shaft 21 is provided with a serration 21A for connected to the connecting device 1A in an upper end outer peripheral portion. The output shaft 22 is provided with a serration 22A for connecting to the connecting device 2A in a lower end outer peripheral portion. A torsion bar 27 is inserted to a hollow portion of the input shaft 21. One end of the torsion bar 27 is coupled to the input shaft 21 by a coupling pin 27A, and the other end of the torsion bar 27 is inserted to a hollow portion of the output shaft 22 so as to be connected by serration.

A torque sensor 23 is provided with two detecting coils 23A and 23B surrounding a cylindrical core 23C engaged with the input shaft 21 and the output shaft 22, in the first housing 11, as shown in FIG. 2. The core 23C is provided with a vertical groove 23E engaging with a guide pin 23D of the output shaft 22 so as to be movable only in an axial direction, and is provided with a spiral groove 23G engaging with a slider pin 23F of the input shaft 21. Accordingly, when a steering torque applied to the steering wheel is applied to the input shaft 21, and a relative displacement in a rotation direction is generated between the input shaft 21 and the output shaft 22 on the basis of an elastic torsional deformation of the torsion bar 27, the displacement in the rotation direction of the input shaft 21 and the output shaft 22 displaces the core 23C in an axial direction. An inductance of the detecting coils 23A and 23B caused by a magnetic change around the detecting coils 23A and 23B due to the displacement of the core 23C is changed. In other words, when the core 23C moves close to the input shaft 21, the inductance of the detecting coil 23A to which the core 23C moves close is increased, and the inductance of the detecting coil 23B from which the core 23C moves apart is reduced, whereby it is possible to detect the steering torque on the basis of the change of the inductance.

The electric motor 24 is attached and supported to the second housing 12 by a mounting bolt 28, and is driven by a controller (not shown) in correspondence to the detected torque of the torque sensor 23. A worm gear 25 is coupled to a rotation shaft 24A of the electric motor 24 by a joint 24B, and the worm wheel 26 engaging with the worm gear 25 is fixed to the output shaft 22. The worm gear 25 is supported at both ends to the second housing 12 by right and left bearings 41 and 42, as shown in FIG. 3. The worm wheel 26 is fixed to the output shaft 22 just below an upper bearing 32A in the output shaft 22, in an inner portion of the second housing 12.

In this case, the joint 24B coupling the rotation shaft 24A of the electric motor 24 and the worm gear 25 is structured such that a torque limiter 24C constituted by an elastic ring is interposed in a fitting gap between both the elements (FIG. 3). The torque limiter 24C maintains coupling between the rotation shaft 24A and the joint 24B under normal using torque conditions of the motor-driven steering assist apparatus 10, allows them to slip under abnormal torque conditions, and does not transmit the torque of the electric motor 24 to a side of the joint 24B.

Accordingly, in the motor-driven steering assist apparatus, an integral unit body 10A is structured by supporting the upper end portion of the input shaft 21 and the torque sensor 23 to the first housing 11. The upper end portion of the output shaft 22, the electric motor 24, the worm gear 25 and the worm wheel 26 are supported by the second housing 12. The lower end portion of the output shaft 22 is supported by the third housing 13. The first housing 11 and the second housing 12 are coupled by the mounting bolt 14, and the second housing 12 and the third housing 13 are coupled by the mounting bolt 15 (FIG. 2). An oil seal 33 is attached in a sealing manner to an upper opening portion of the bearing 31 in the first housing 11, and an oil seal 34 is attached in a sealing manner to a lower opening portion of the bearing 32B in the third housing 13 (FIG. 2).

Further, the motor-driven steering assist apparatus 10 is structured such that the second housing 12 can be attached to the vehicle body side. The motor-driven steering assist apparatus 10 is structured, as shown in FIGS. 1 and 2, such that elastic members 51 and 52 such as a rubber bush or the like are provided in both sides of attaching bosses 12A provided at a plurality of positions (for example, three positions) in a peripheral direction of an outer periphery of the second housing 12. The attaching bosses 12A are pinched between upper and lower support pieces 18A and 18B of forked support portions 18 provided at a plurality of positions corresponding to the attaching bosses 12A of the vehicle body side attaching stay 17 via the elastic members 51 and 52. The attaching boss 12A is pinched in a floating fixed state between the upper and lower support pieces 18A and 18B via the elastic members 51 and 52 by the support pieces 18A and 18B of the forked support portion 18, and the elastic members 51 and 52. An attaching bolt 16 (a nut 16A) inserted and attached to a bolt hole provided in each of the attaching bosses 12A. The vehicle body side bracket 17 is supported to the vehicle body frame.

Accordingly, in the motor-driven steering assist apparatus 10, in order to improve the connecting workability between the steering shaft 1 and the input shaft 21 of the motor-driven steering assist apparatus 10 when the steering shaft 1 is supported to the support member 4 of the vehicle body side stay 3 and the motor-driven steering assist apparatus 10 is supported to the vehicle body side bracket 17, the steering shaft 1 is rotatably supported to a spherical sliding bearing 60 attached to the support member 4 of the vehicle body side stay 3. In this case, the spherical sliding bearing 60 can apply a radial load of the steering shaft 1 and a thrust load in both directions, an upward direction and a downward direction, and is structured such that an outer peripheral spherical surface of an inner ring 62 is brought into spherical contact with an inner peripheral spherical surface of an outer ring 61 via a lubricating liner 100.

The spherical sliding bearing 60 is structured such that the outer ring 61 is immobilized to the inner periphery of the annular support member 4 of the vehicle body side stay 3 in accordance with a press-fitting or other means. Further, when the steering shaft 1 is inserted to the inner ring 62 of the spherical sliding bearing 60 and the collar portion 1A provided in the intermediate portion of the steering shaft 1 is brought into contact with one end surface of the inner ring 62, the other end surface of the inner ring 62 is pressed by a nut 71 screwed into the steering shaft 1, and the inner ring 62 is pinched and fixed between the nut 71 and the collar portion 1A.

In this case, the outer ring 61 of the spherical sliding bearing 60 may be structured by the support member 4 itself of the vehicle body side stay 3.

In accordance with the motor-driven steering assist apparatus 10, the steering torque applied to the steering wheel is detected by the torque sensor 23, the electric motor 24 is driven on the basis of the detected torque, and the torque generated by the electric motor 24 is transmitted to the output shaft 22 via the worm gear 25 and the worm wheel 26. Accordingly, the torque generated by the electric motor 24 can be used as the assist force for the steering force applied to the steering wheel by the driver.

In accordance with the present embodiment, the following operations and effects can be achieved.

(a) It is possible to assemble each of the steering shaft 1 and the motor-driven steering assist apparatus 10 in the vehicle body side, and connect the steering shaft 1 to the input shaft 21 of the motor-driven steering assist apparatus 10. The motor-driven steering assist apparatus 10 can regulate the attaching attitude in the range of the play of the attaching bolt insertion hole provided in the vehicle body side bracket 17. The steering shaft 1 may be supported to the vehicle body side stay 3 via the spherical sliding bearing 60, and the axial core of the steering shaft 1 can be tilted around a center of the spherical surface of the spherical sliding bearing 60. Accordingly, even if the initial axial cores of the steering shaft 1 and the input shaft 21 are shifted, it is possible to align the axial cores so as to easily dissolve the axial displacement, and it is possible to easily connect the steering shaft 1 and the input shaft 21.

(b) It is possible to support the steering shaft 1 to the spherical sliding bearing 60 attached to the vehicle body side stay 3, by insetting the steering shaft 1 to the inner ring 62 of the spherical sliding bearing 60, and pinching the collar portion 1A provided in the intermediate portion of the steering shaft 1 and the nut 71 screwed to the steering shaft 1.

Figure 4:
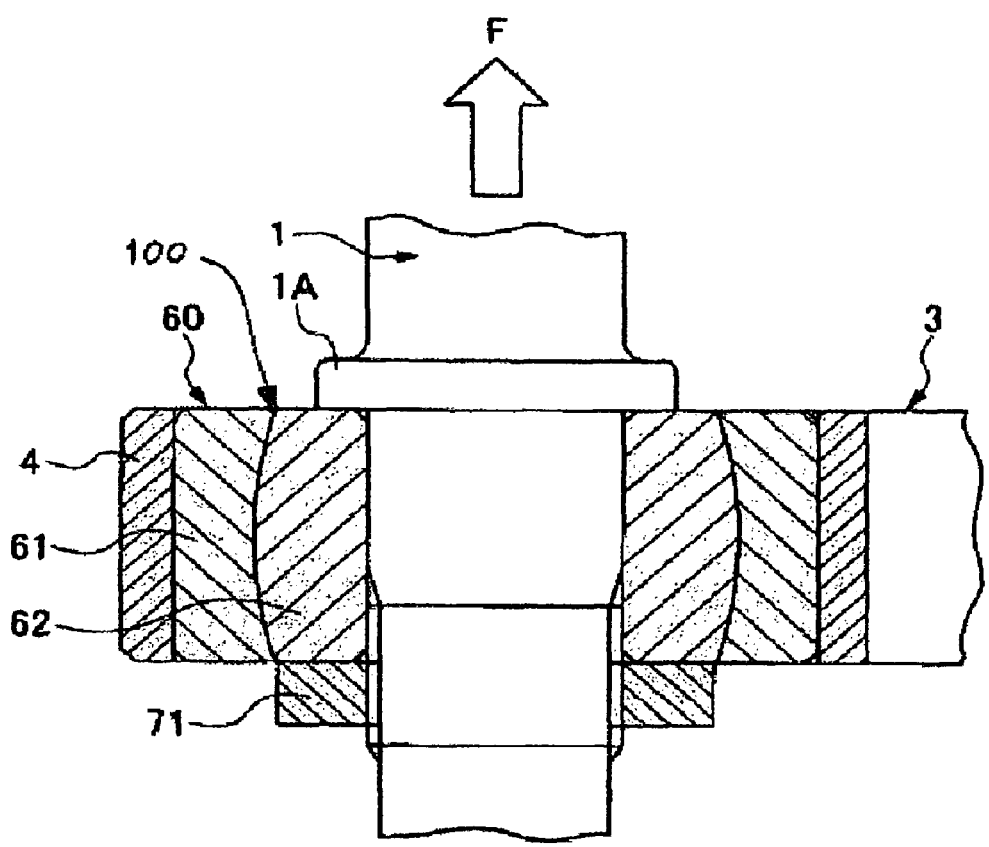
FIG. 4 is a cross sectional view showing a steering shaft support structure in accordance with the embodiment 1.

In this case, in accordance with the present embodiment, since the spherical sliding bearing 60 bears the radial load applied to the steering shaft 1 and the thrust load in both upward and downward directions, the steering shaft 1 is supported to the spherical sliding bearing 60 so as to be immobile in the axial direction. Accordingly, even if the load in the axial direction generated by the driver pulling up the steering wheel in the upward direction or pushing down the steering wheel in the downward direction (reference symbol F in FIG. 4 indicates the pull-up load) is applied to the steering shaft 1, the load in the axial direction neither displaces the steering shaft 1 in the axial direction, nor is applied to the torque sensor 23, thereby preventing the torque sensor 23 from producing an improper operating signal or breaking.

Embodiment 2

Figure 5:
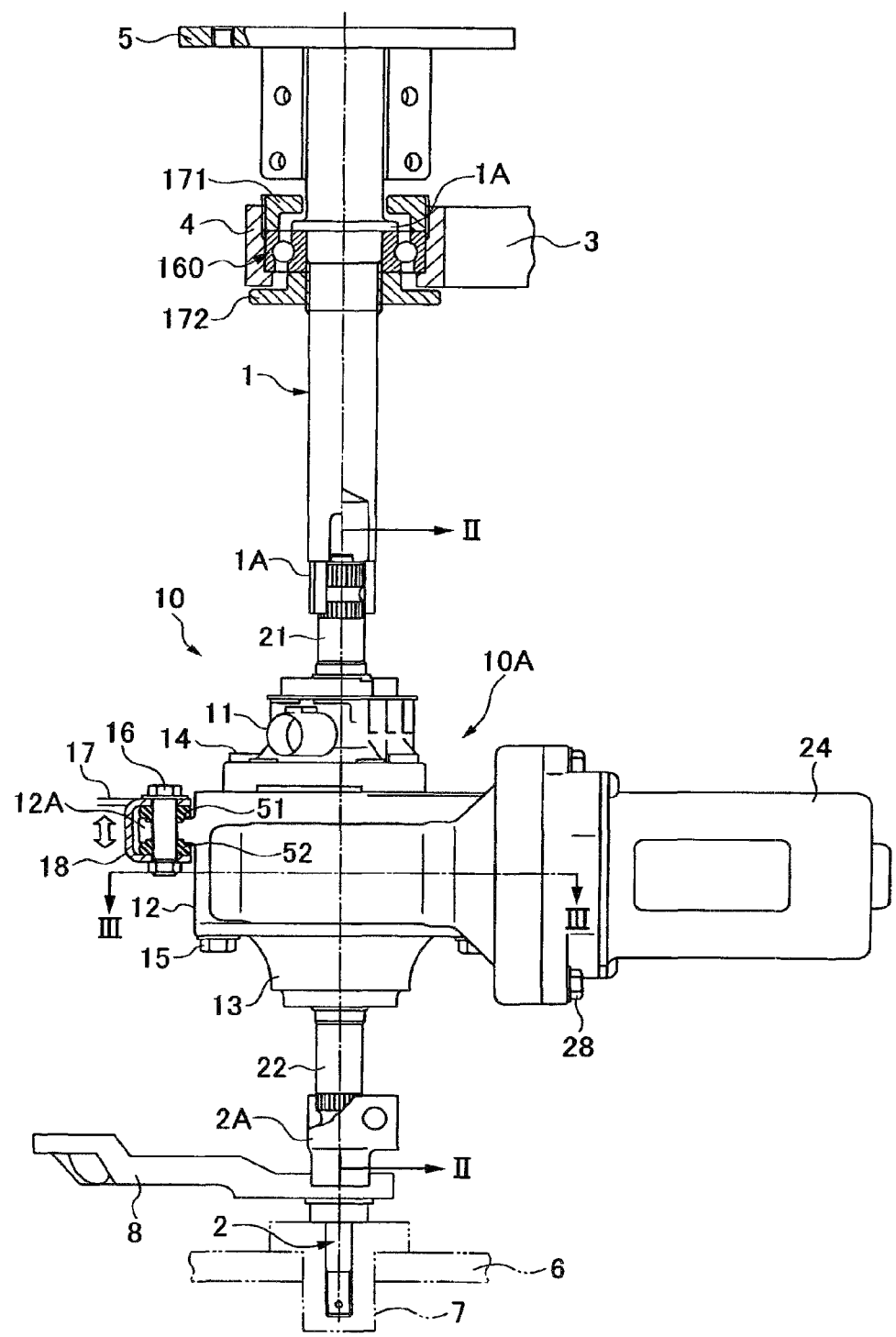
FIG. 5 is a front elevational view showing a motor-driven steering assist apparatus in accordance with an embodiment 2.
Figure 6:
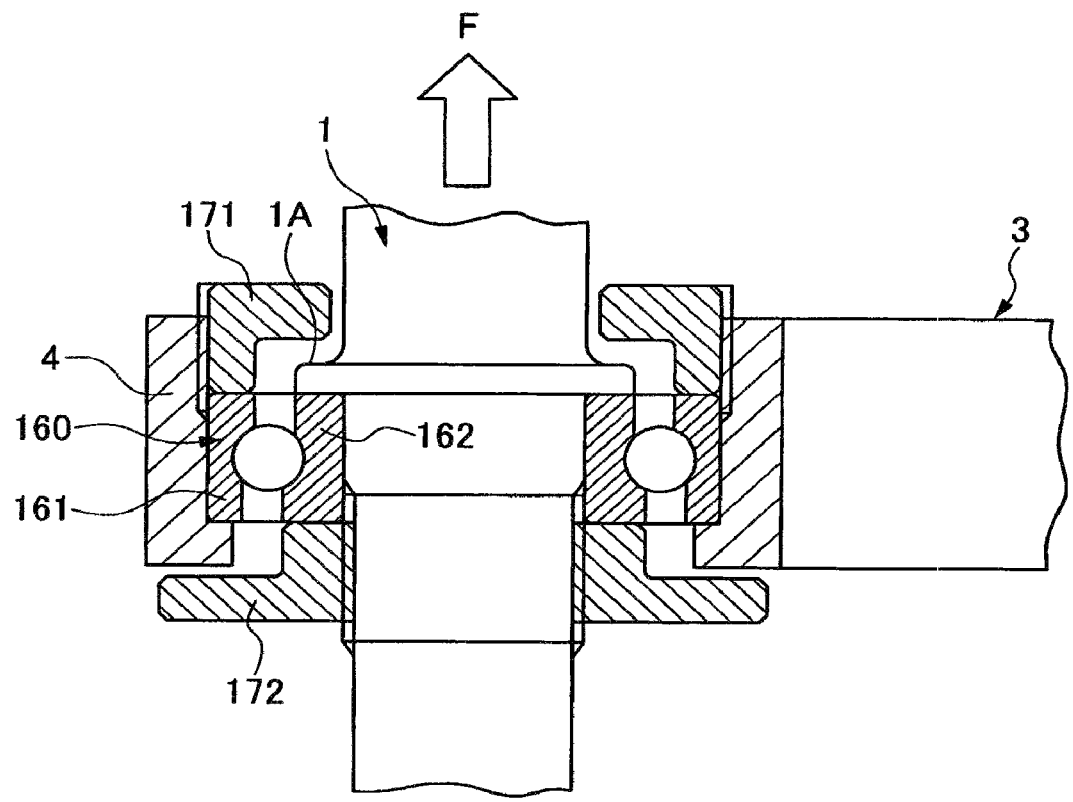
FIG. 6 is a cross sectional view showing a steering shaft support structure in accordance with the embodiment 2.

A description will be given of a motor-driven steering assist apparatus 10 in accordance with an embodiment 2 (FIGS. 5 and 6).

In this case, the same reference numerals are attached to elements in the embodiment 2 substantially the same as those of the embodiment 1, and a description thereof will be omitted.

In the motor-driven steering assist apparatus 10, in order to prevent the load in the axial direction for pulling up or pushing down applied to the steering shaft 1 from the steering wheel (reference symbol F in FIG. 6 indicates the pull-up load) from being applied to the torque sensor 23 via the input shaft 21, the steering shaft 1 is supported to a bearing 160 of the support member 4 attached to the upper vehicle body side stay 3 so as to be rotatable and immobile in the axial direction.

The bearing 160 includes, for example, an angular contact ball bearing which can simultaneously bear the radial load and the thrust load of the steering shaft 1, as shown in FIG. 6. It is structured such that in a state in which an outer ring 161 is loaded to an inner periphery of the annular support member 4 of the upper vehicle body side stay 3, and one end surface of the outer ring 161 is brought into contact with an inner peripheral step portion of the support member 4, the other end surface of the outer ring 161 is pressed by a nut 171 screwed into the inner periphery of the support member 4, and the outer ring 161 is pinched and fixed between the nut 171 and the inner peripheral step portion of the support member 4. When the steering shaft 1 is inserted to the inner ring 162 of the bearing 160, and one end surface of the inner ring 162 is brought into contact with the collar portion 1A provided in the intermediate portion of the steering wheel 1, the other end surface of the inner ring 162 is pressed by a nut 172 screwed into the steering shaft 1, and the inner ring 162 is pinched and fixed between the nut 172 and the collar portion 1A.

In this case, the bearing 160 may employ a structure which can simultaneously bear the radial load of the steering shaft 1 and the thrust load (the pull-up load and the push-down load) in both directions (the upward direction and the downward direction).

In accordance with the motor-driven steering assist apparatus 10, the steering torque applied to the steering wheel is detected by the torque sensor 23, the electric motor 24 is driven on the basis of the detected torque, and the torque generated by the electric motor 24 is transmitted to the output shaft 22 via the worm gear 25 and the worm wheel 26. Accordingly, the torque generated by the electric motor 24 can be used as the assist force for the steering force applied to the steering wheel by the driver.

In accordance with the present embodiment, the following operations and effects can be achieved.

(a) There may be circumstances where the driver pulls up the steering wheel in the upward direction or pushes down the steering wheel in the downward direction, at a time when the vehicle to which the motor-driven steering assist apparatus 10 is mounted travels, so that the pull-up load or the push-down load is applied in the axial direction of the steering shaft 1. At this time, since the steering shaft 1 is supported to the bearing 160 attached to the upper vehicle body side stay 3 so as to be immobile in the axial direction, the load in the axial direction mentioned above applied to the steering shaft 1 is supported to the bearing 160 so as to neither displace the steering shaft 1 in the axial direction nor be applied to the torque sensor 23. Therefore, it is possible to prevent the torque sensor 23 from producing an improper operation signal or breaking, and it is possible to secure the stable steering assist performance.

(b) It is possible to support the steering shaft 1 to the bearing 160 attached to the bearing 160 attached to the upper vehicle body side stay 3 so as to be immobile in the axial direction, by fixing the outer ring 161 of the bearing 160 to the upper vehicle body side stay 3 by nut, inserting the steering shaft 1 to the inner ring 162 of the bearing 160, and pinching the inner ring 162 between the collar portion 1A provided in the intermediate portion of the steering shaft 1 and the nut 172 screwed into the steering shaft 1.

Embodiment 3

Figure 7:
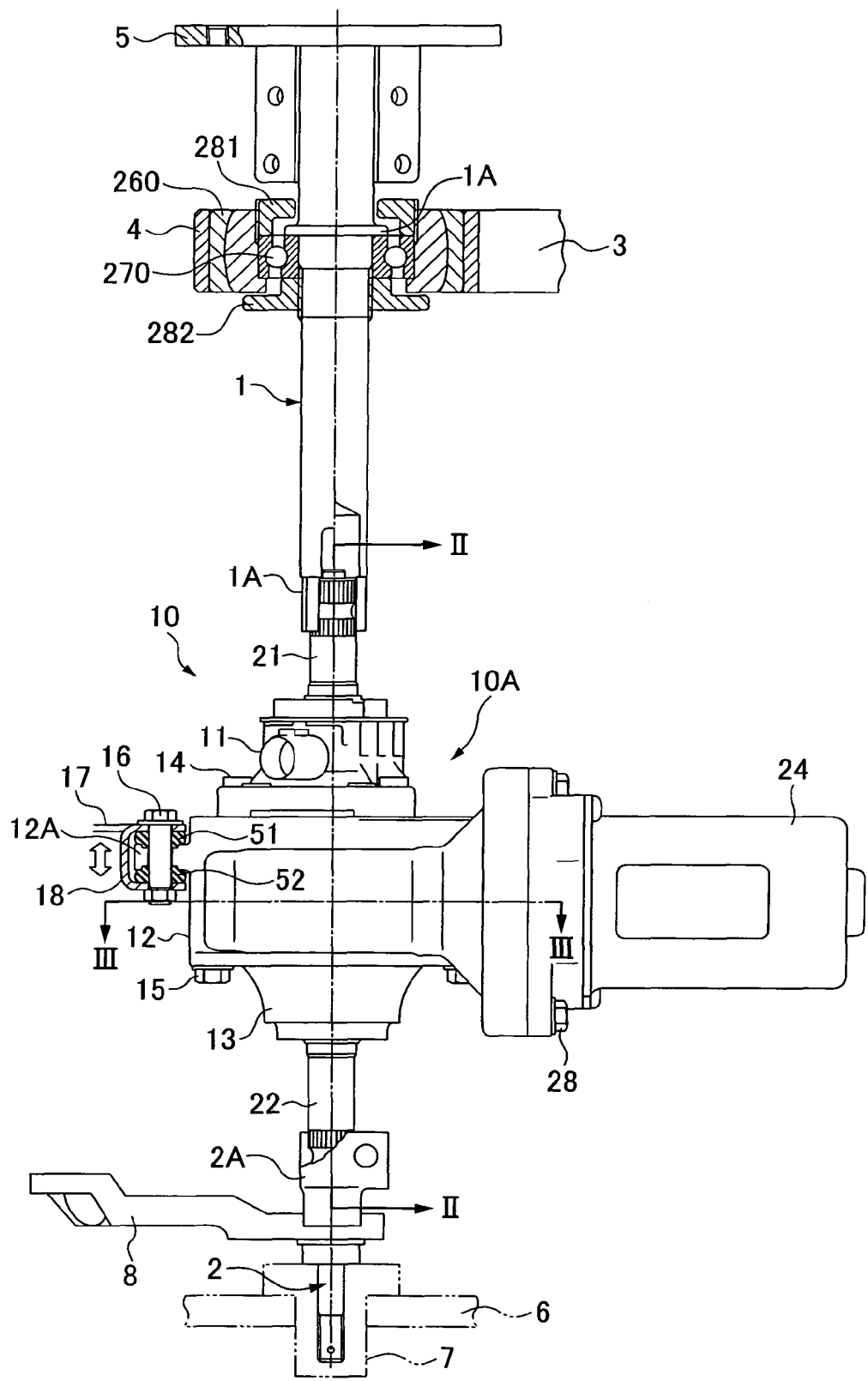
FIG. 7 is a front elevational view showing a motor-driven steering assist apparatus in accordance with an embodiment 3.
Figure 8:
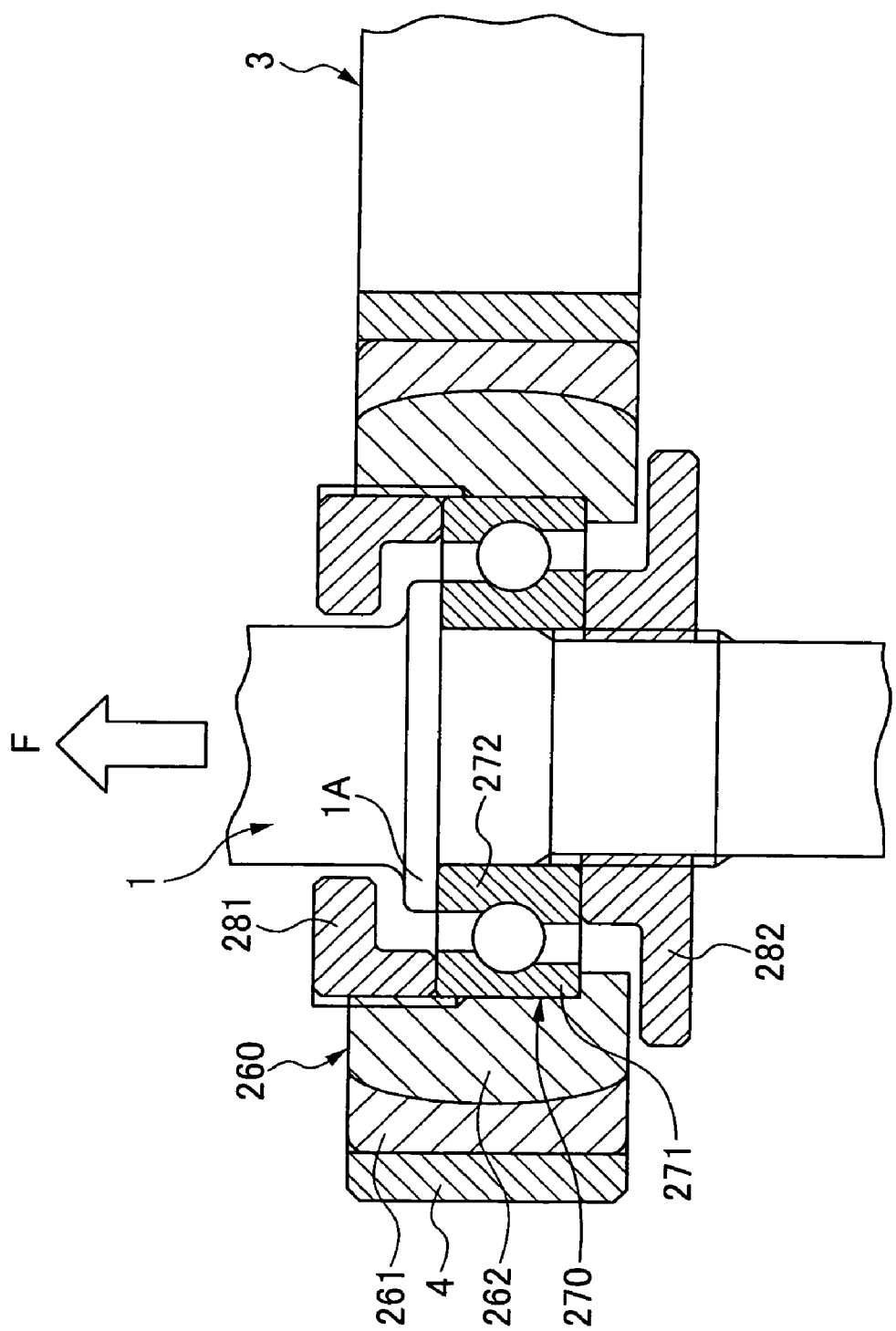
FIG. 8 is a cross sectional view showing a steering shaft support structure in accordance with the embodiment 3.
Figure 9:
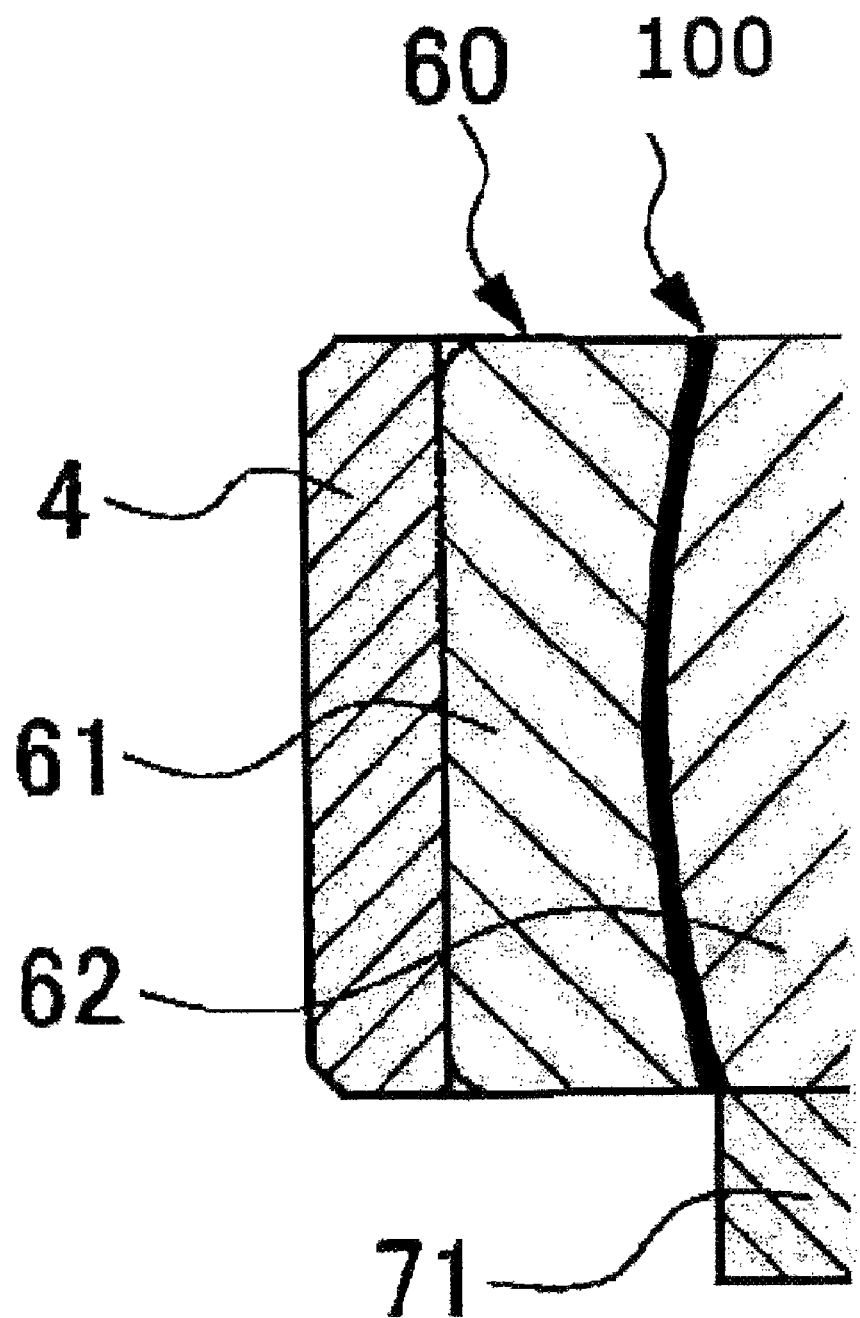
FIG. 9 is a cross sectional view showing one embodiment of a lubricating liner 100.
Figure 10:
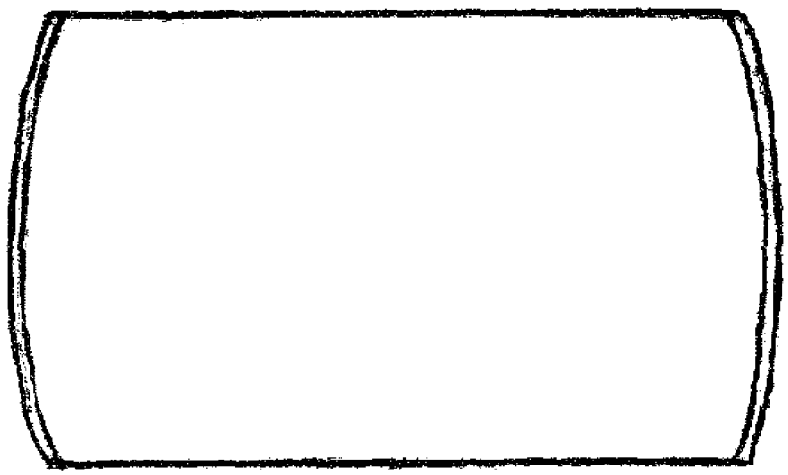
FIG. 10 is a section view of one embodiment of the lubricating liner 100.

A description will be given of a motor-driven steering assist apparatus 10 in accordance with an embodiment 3 (FIGS. 7 and 8).

In this case, the same reference numerals are attached to elements in the embodiment 3 substantially the same as those of the embodiment 1, and a description thereof will be omitted.

In accordance with the motor-driven steering assist apparatus 10, it may be desirable to improve connecting workability between the steering shaft 1 and the input shaft 21 of the motor-driven steering assist apparatus 10, and prevent the pull-up or push-down load in the axial direction (reference symbol F in FIG. 7 indicates the pull-up load) applied to the steering shaft 1 from the steering wheel from being applied to the torque sensor 23 via the input shaft 21, while supporting the steering shaft to the support member 4 of the vehicle body side stay 3 and supporting the motor-driven steering assist apparatus 10 to the vehicle body side bracket 17. A spherical sliding bearing 260 may be attached to the support member 4 of the vehicle body side stay 3, and the steering shaft 1 is supported to a bearing 270 fixed to an inner periphery of the spherical sliding bearing 260 so as to be rotatable and immobile in the axial direction.

The spherical sliding bearing 260 can simultaneously bear the radial load and the thrust load in both directions, the upward direction and the downward direction, of the steering shaft 1, and is structured such that the outer peripheral spherical surface of the inner ring 262 is brought into spherical contact with the inner peripheral spherical surface of the outer ring 261 via the lubricating liner or the like. The bearing 270 is constituted, for example, by the angular contact ball bearing which can simultaneously bear the radial load and the thrust load.

The spherical sliding bearing 260 is structured such that the outer ring 261 is immobilized to the inner periphery of the annular support member 4 of the vehicle body side stay 3 in accordance with a press-fitting operation or other means. Where the outer ring 271 of the bearing 270 is inserted to the inner periphery of the inner ring 262 of the spherical sliding bearing 260 and one end surface of the outer ring 271 of the bearing 270 is brought into contact with an inner peripheral step portion of the inner ring 262 of the spherical sliding bearing 260, the other end surface of the outer ring 271 is pressed by a nut 281 screwed into the inner periphery of the inner ring 262, and the outer ring 271 is pinched and fixed between the nut 281 and the inner peripheral step portion of the inner ring 262. Further, where the steering shaft 1 is inserted to the inner ring 272 of the bearing 270 and one end surface of the inner ring 272 is brought into contact with the collar portion 1A provided in the intermediate portion of the steering shaft 1, the other end surface of the inner ring 272 is pressed by a nut 282 screwed into the steering shaft 1, and the inner ring 272 is pinched and fixed between the nut 282 and the collar portion 1A.

In this case, the outer ring 261 of the spherical sliding bearing 260 may be structured by the support member 4 itself of the vehicle body side stay 3.

In accordance with the motor-driven steering assist apparatus 10, the steering torque applied to the steering wheel is detected by the torque sensor 23, the electric motor 24 is driven on the basis of the detected torque, and the torque generated by the electric motor 24 is transmitted to the output shaft 22 via the worm gear 25 and the worm wheel 26. Accordingly, the torque generated by the electric motor 24 can be used as the assist force for the steering force applied to the steering wheel by the driver.

In accordance with the present embodiment, the following operations and effects can be achieved.

(a) When it is intended to assemble each of the steering shaft 1 and the motor-driven steering assist apparatus 10 in the vehicle body side, and connect the steering shaft 1 to the input shaft 21 of the motor-driven steering assist apparatus 10, the motor-driven steering assist apparatus 10 can regulate the attaching attitude in the range of the play of the attaching bolt insertion hole provided in the vehicle body side bracket 17. The steering shaft 1 is supported to the vehicle body side stay 3 via the spherical sliding bearing 260, and the axial core of the steering shaft 1 can be tilted around a center of the spherical surface of the spherical sliding bearing 260. Accordingly, even if the initial axial cores of the steering shaft 1 and the input shaft 21 are shifted, it is possible to align the axial cores so as to easily dissolve the axial displacement, and it is possible to easily connect the steering shaft 1 and the input shaft 21.

(b) There may be circumstances where the driver pulls up the steering wheel in the upward direction or pushes down the steering wheel in the downward direction at a time when the vehicle to which the motor-driven steering assist apparatus 10 is mounted travels, so that the pull-up load or the push-down load is applied in the axial direction of the steering shaft 1. At this time, since the steering shaft 1 is supported to the bearing 270 fixed to the inner periphery of the spherical sliding bearing 260 attached to the vehicle body side stay 3 so as to be immobile in the axial direction, and the spherical sliding bearing 260 bears the radial load and the slide load in both the upward and downward directions applied to the steering shaft 1, the steering shaft 1 is supported to both of the spherical sliding bearing 260 and the bearing 270 so as to be immobile in the axial direction. Accordingly, the load in the axial direction mentioned above applied to the steering shaft 1 is supported to the spherical sliding bearing 260 and the bearing 270 so as to neither displace the steering shaft 1 in the axial direction nor be applied to the torque sensor 23. Therefore, it is possible to prevent the torque sensor 23 from producing an improper operation signal or breaking, and it is possible to secure the stable steering assist performance.

(c) It is possible to support the steering shaft 1 to the bearing 270 fixed to the spherical sliding bearing 260 attached to the vehicle body side stay 3 so as to be immobile in the axial direction, by fixing the outer ring 271 of the bearing 270 to the inner periphery of the spherical sliding bearing 260 by a nut, inserting the steering shaft 1 to the inner ring 272 of the bearing 270, and pinching the inner ring 272 between the collar portion 1A provided in the intermediate portion of the steering shaft 1 and the nut 282 screwed into the steering shaft 1.

As heretofore explained, embodiments of the present invention have been described in detail with reference to the drawings. However, the specific configurations of the present invention are not limited to the illustrated embodiments but those having a modification of the design within the range of the presently claimed invention are also included in the present invention. For example, the spherical bearing in accordance with the present invention is not limited to the spherical sliding bearing, but may be constituted by a self-aligning ball bearing, a self-aligning roller bearing or the like.

Further, in the present invention, the gear trail transmitting the rotation of the electric motor to the output shaft is not limited to the structure constituted by the worm gear and the worm wheel. Any other equivalently functioning gear arrangement may be employed.

Although the invention has been illustrated and described with respect to several exemplary embodiments thereof, it should be understood by those skilled in the art that the foregoing and various other changes, omissions and additions may be made to the present invention without departing from the spirit and scope thereof. Therefore, the present invention should not be understood as limited to the specific embodiment set out above, but should be understood to include all possible embodiments which can be encompassed within a scope of equivalents thereof with respect to the features set out in the appended claims.

What is claimed is:

1. A steering shaft support structure of a motor-driven steering assist apparatus structured such that a steering shaft supported to a vehicle body side is connected to an input shaft of the motor-driven steering assist apparatus supported to the vehicle body side, the steering shaft is supported to a spherical bearing attached to a vehicle body side stay, wherein the steering shaft is insertable to an inner periphery of the spherical bearing, and the spherical bearing is pinched between a collar portion provided in an intermediate portion of the steering shaft, and a nut screwed into the steering shaft.

2. A steering shaft support structure of a motor-driven steering assist apparatus as claimed in claim 1, wherein the spherical bearing comprises a spherical sliding bearing structured such that an outer peripheral spherical surface of an inner ring is brought into spherical contact with an inner peripheral spherical surface of an outer ring via a lubricating liner.

3. A steering shaft support structure of a motor-driven steering assist apparatus as claimed in claim 2, wherein the spherical sliding bearing is structured such that the outer ring is fixed to an inner periphery of an annular support member provided in the vehicle body side stay in accordance with a press-fitting arrangement.

4. A steering shaft support structure of a motor-driven steering assist apparatus as claimed in claim 3, wherein the steering shaft is insertable to the inner ring of the spherical sliding bearing, and the collar portion provided in the intermediate portion of the steering shaft is in contact with one end surface of the inner ring, the other end surface of the inner ring being pressed by a nut screwed into the steering shaft, the inner ring being pinched and fixed between the nut and the collar portion.

* * * * *